United States Patent
Yoshida et al.

(10) Patent No.: US 7,353,649 B2
(45) Date of Patent: Apr. 8, 2008

(54) HYDRAULIC PRESSURE SUPPLY CONTROL IN INDUSTRIAL VEHICLE

(75) Inventors: Naoki Yoshida, Zama (JP); Kiyoshi Inoue, Machida (JP); Makoto Wagatsuma, Tachikawa (JP); Toru Takamura, Zama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 164 days.

(21) Appl. No.: 11/434,229

(22) Filed: May 16, 2006

(65) Prior Publication Data

US 2006/0260301 A1 Nov. 23, 2006

(30) Foreign Application Priority Data

May 17, 2005 (JP) ............................. 2005-143850

(51) Int. Cl.
*F16D 31/02* (2006.01)
(52) U.S. Cl. ............................. 60/431; 60/368; 60/394; 60/422
(58) Field of Classification Search .................. 60/368, 60/394, 422, 431, 433, 448, 484
See application file for complete search history.

(56) References Cited

U.S. PATENT DOCUMENTS 4,457,132 A * 7/1984 Roberts ........................ 60/431
4,470,259 A 9/1984 Miller et al.

FOREIGN PATENT DOCUMENTS

| EP | 1 182 357 A1 | 2/2002 |
| JP | 5-005658 U | 1/1993 |

* cited by examiner

*Primary Examiner*—Michael Leslie
(74) *Attorney, Agent, or Firm*—Foley & Lardner LLP

(57) ABSTRACT

A priority flow rate control valve (30) distributes pressurized working oil discharged from a hydraulic pump (10) driven by an electric motor (11) to a power steering device (20) first, and distributes the residual pressurized working oil to a cargo handling device (19). The rotation speed of the electric motor (11) and the distribution ratio of the pressurized working oil of the priority flow rate control valve (30) vary depending on the operation states of these devices (19, 20). By decreasing the rotation speed of the electric motor (11) at a rate smaller than a normal decrease rate when the cargo handling device (2) stops operation in a state where the power steering device (20) and the cargo handling device (19) are in operation, a kickback in a steering wheel (7) due to a response delay of the priority flow rate control valve (30) can be prevented.

8 Claims, 8 Drawing Sheets

HYDRAULIC PRESSURE SUPPLY CONTROL IN INDUSTRIAL VEHICLE

FIELD OF THE INVENTION

This invention relates to hydraulic pressure supply control for power steering and cargo handling of an industrial vehicle such as a fork-lift track.

BACKGROUND OF THE INVENTION

JPH05-005658U published by the Japan Patent Office in 1993 discloses a hydraulic pressure supply device which supplies pressurized working oil to a power steering device and a cargo handling device of an industrial vehicle such as a fork-lift truck, from a single hydraulic pump via a priority flow rate control valve.

The hydraulic pump is driven by an electric motor. The steering operation and cargo handling operation performed by the operator of the vehicle are respectively detected by sensors, and a controller performs chopper control of the electric motor based on the detection data by the sensors such that the discharge amount of the pressurized working oil by the hydraulic pump satisfies the working oil amount which is required by the power steering device and the cargo handling device.

The priority flow rate control valve comprises a valve spool which displaces in response to a differential pressure between a pressure in a pressure supply port of the priority flow rate control valve and a load signal pressure generated in the power steering device. The pressure in the load signal pressure port is led to the priority flow rate control valve via an orifice so as to act on an end surface of the valve spool. The power steering device is configured to raise the load signal pressure, when the working oil amount supplied thereto is in short supply with respect to an angular velocity of a steering wheel, so as to cause the valve spool to displace in a direction that increases the distribution ratio of the pressurized working oil to the power steering device.

SUMMARY OF THE INVENTION

Herein, reduction in the flow area caused by the orifice brings about a time delay extending from a variation in the load signal pressure in the power steering device until displacement of the valve spool occurs. This time delay may cause the following problem.

Specifically, when the operation of the cargo handling device stops in a state where both the power steering device and the cargo handling device are in operation, the controller lowers the rotation speed of the electric motor so as to decrease the discharge flow rate of the hydraulic pump. On the other hand, the priority flow rate control valve displaces the valve spool so as to increase the distribution ratio of the pressurized working oil to the power steering device.

However, if the discharge flow rate of the hydraulic pump is decreased before the completion of displacement of the valve spool due to the above time delay, the working oil amount supplied to the power steering device temporarily falls into short supply, and as a result, a so-called kickback, or in other words a sudden increase in a rotational resistance of the steering wheel, may occur.

It is therefore an object of this invention to prevent a kickback from occurring when a hydraulic device stops operation in a state where the hydraulic pump supplies pressurized working oil to both the power steering device and the hydraulic device.

In order to achieve the above object, this invention provides a hydraulic pressure supply device for supplying pressurized working oil to a power steering device and a cargo handling device of an industrial vehicle, comprising a hydraulic pump which discharges the pressurized working oil, a flow rate control valve which distributes the pressurized working oil to the power steering device and the cargo handling device, and a programmable controller.

The flow rate control valve varies a distribution ratio between the pressurized working oil distributed to the power steering device and the pressurized working oil distributed to the cargo handling device according to a load signal pressure indicative of an amount of the pressurized working oil required by the steering device.

The programmable controller is programmed to cause a discharge flow rate of the hydraulic pump to increase when the cargo handling device is in operation and decrease when the cargo handling device stops operation, determine if the cargo handling device has stopped operation in a state where both the power steering device and the cargo handling device are in operation, and cause a delay in decreasing the discharge flow rate of the hydraulic pump when the cargo handling device has stopped operation in a state where both the power steering device and the cargo handling device are in operation.

This invention also provides a hydraulic pressure supply method for supplying pressurized working oil to the power steering device and the cargo handling device from the hydraulic pump described above.

The method comprises causing a discharge flow rate of the hydraulic pump to increase when the cargo handling device is in operation and decrease when the cargo handling device stops operation, determining if the cargo handling device has stopped operation in a state where both the power steering device and the cargo handling device are in operation, and causing a delay in decreasing the discharge flow rate of the hydraulic pump when the cargo handling device has stopped operation in a state where both the power steering device and the cargo handling device are in operation.

The details as well as other features and advantages of this invention are set forth in the remainder of the specification and are shown in the accompanying drawings.

DESCRIPTION OF THE PREFERRED EMBODIMENTS

Figure 1:
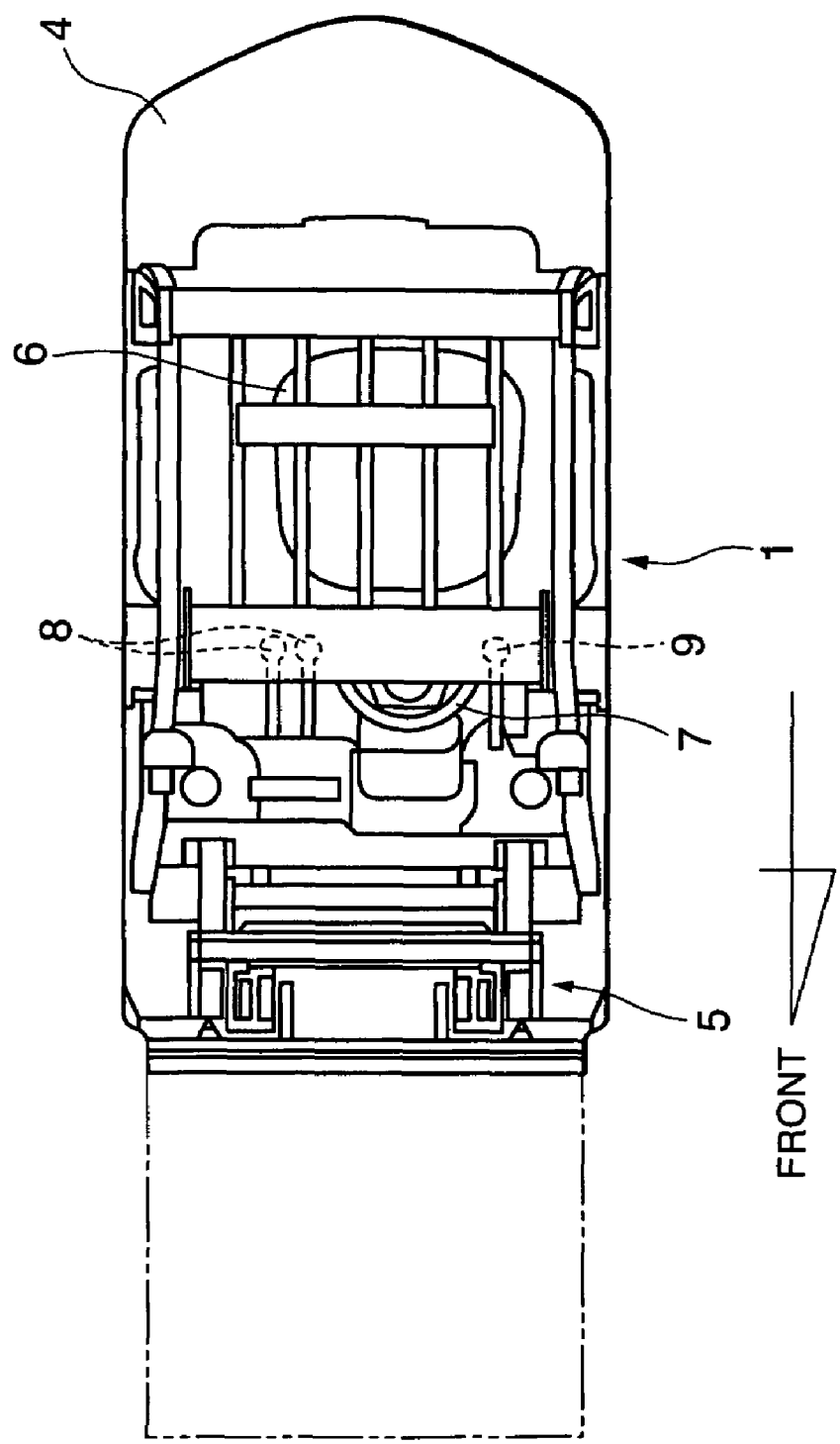
FIG. 1 is a plan view of a battery driven fork-lift truck into which a hydraulic pressure supply device according to this invention is installed.
Figure 2:
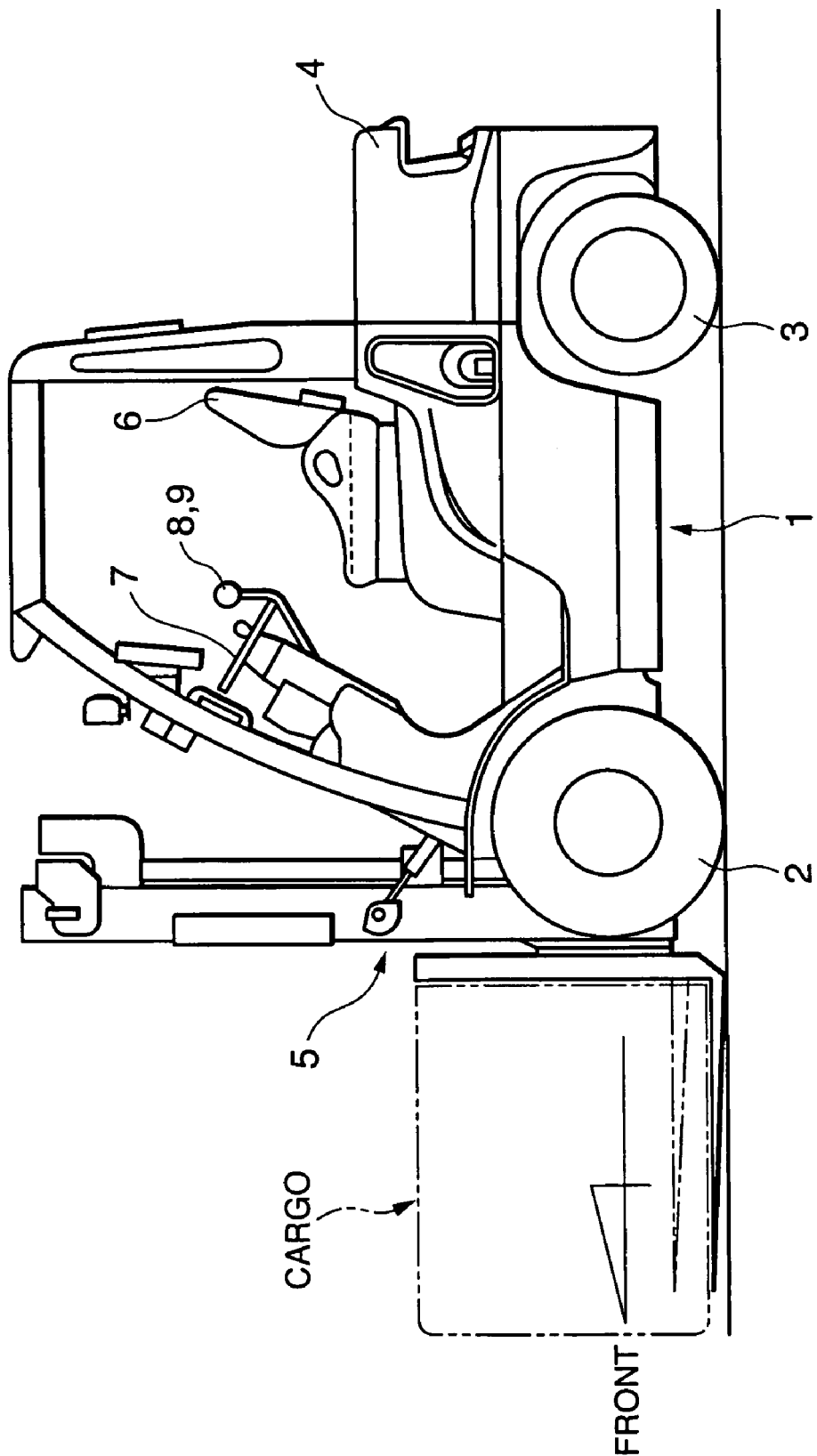
FIG. 2 is a side view of the fork-lift truck.

Referring to FIG. 1 and FIG. 2 of the drawings, a battery driven fork-lift truck comprises a pair of drive wheels 2 in a front most position of a vehicle body 1, and a pair of steered wheels 3 in a rear most position of the vehicle body 1. The pair of drive wheels 2 are driven respectively by a right wheel drive motor and a left wheel drive motor. The steered wheels 3 are disposed under a counter weight 4. The fork-lift truck further comprises a mast apparatus 5 disposed in front of the drive wheels 2 for handling cargos and an operator's cab 6 located between the pair of drive wheels 2 and the pair of steered wheels 3.

A steering wheel 7, a cargo handling control lever 8 for operating the mast device 5, a forward/rearward running control lever 9, an accelerator pedal, and a brake pedal are installed in the operator's cab 6. The forward/rearward running control lever 9 has three operating positions, forward running, neutral, and rearward running positions, which are selectively applied.

Figure 3:
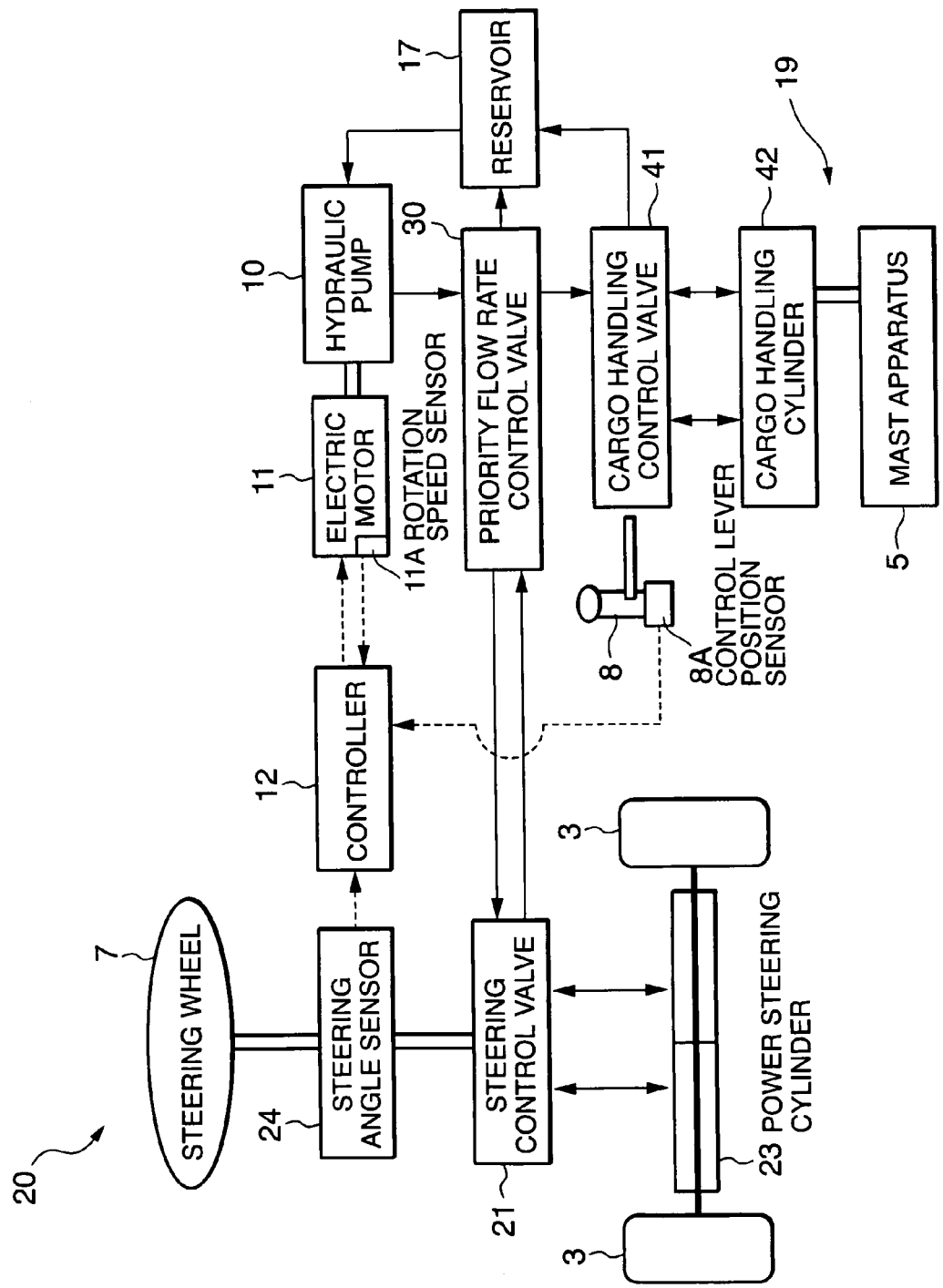
FIG. 3 is a schematic diagram of the hydraulic pressure supply device.

Referring to FIG. 3, the pair of steered wheels 3 gyrate under the assist force generated by the power steering cylinder 23 according to a steering operation of the steering wheel 7. The power steering cylinder 23 generates an assist force for steering the steered wheels 3 according to the supply of a pressurized working oil that is controlled by a steering control valve 21. In the following description, the steering wheel 7, the steering control valve 21, the power steering cylinder 23, and the steered wheels 3 are referred to collectively as a power steering device 20. The power steering device 20 is a so-called full hydraulic power steering device.

The mast apparatus 5 performs different actions, i.e. tilting a mast and hoisting a fork along the mast. A tilt cylinder performs the former action according to the pressurized working oil supplied thereto, and a lift cylinder performs the latter action according to the pressurized working oil supplied thereto. A tilt cylinder controls the pressurized working oil supply to the tilt cylinder in response to the position of a tilt control lever which the operator has operated. A lift cylinder controls the pressurized working oil supply to the lift cylinder in response to the position of a lift control lever which the operator has operated.

Since the differences between the tilt cylinder and the lift cylinder have no direct relation to this invention, the tilt cylinder and the lift cylinder are hereinafter referred to generally as a cargo handling cylinder 42. Similarly, the tilt control valve and the lift control valve are hereinafter referred to generally as a cargo handling control valve 41. Similarly, the tilt control lever and the lift control lever are hereinafter referred to generally as the cargo handling control lever 8. Further, the cargo handling control lever 8, the cargo handling control valve 41, the cargo handling cylinder 42 and the mast apparatus 5 are hereinafter referred to collectively as a cargo handling device 19.

The pressurized working oil for the cargo handling device 19 and the power steering device 20 is supplied from a hydraulic pump 10 via a priority flow rate control valve 30. The hydraulic pump 10 is driven by an electric motor 11, suctions working oil from a reservoir 17 and discharges the working oil after pressurizing. The discharge flow rate of the hydraulic pump 10 is controlled by a controller 12 through control of a rotation speed of the electric motor 11.

In order to control the discharge flow rate of the hydraulic pump 10, detection data from a steering angle sensor 24 constituted, for example, by a potentiometer disposed on a rotation shaft of the steering wheel 7 to detect a rotation angle of the steering wheel 7, a control lever position sensor 8A which detects an operation position of the cargo handling control lever 8, and a rotation speed sensor 11A which detects a rotation speed of the electric motor 11, are respectively input into the controller 12 in the form of signals. It should be noted that the controller 12 obtains an angular velocity of the steering wheel 7 from the signals input from the steering angle sensor 24.

Figure 4:
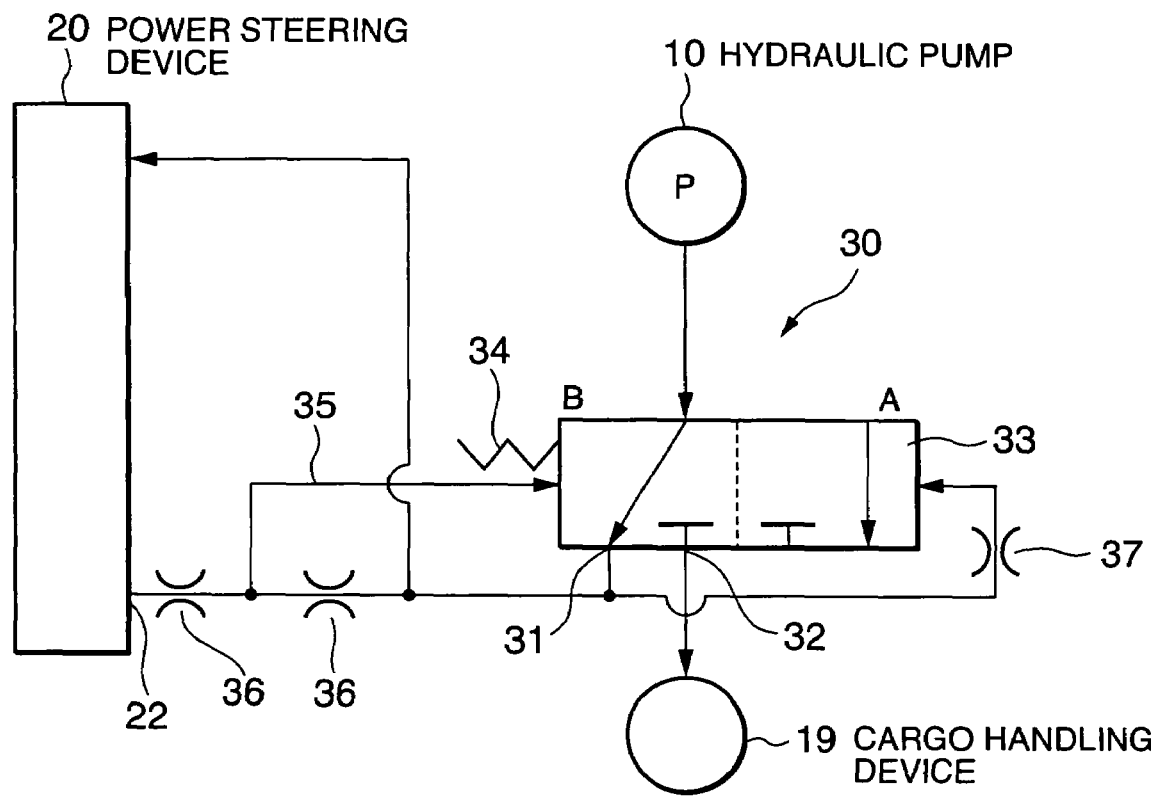
FIG. 4 is a hydraulic circuit diagram of a priority flow rate control valve used in the hydraulic pressure supply device.

Referring to FIG. 4, the priority flow rate control valve 4 is a valve which distributes the pressurized working oil discharged by the hydraulic pump 10 to the steering device by priority, and distributes the residual pressurized working oil to the cargo handling device 19.

The priority flow rate control valve 30 comprises a valve spool 33, a priority discharge port 31, and a residual oil discharge port 32. The valve spool 33 moves between a section A at which the pressurized working oil discharged from the hydraulic pump 10 is supplied to the residual oil discharge port 32 and a section B at which the pressurized working oil discharged from the hydraulic pump 10 is supplied to the priority discharge port 31, thereby arbitrarily varying a ratio of pressurized working oil supply to the ports 31, 32. The priority discharge port 31 is connected to the power steering device 20, or more specifically, connected to the steering control valve 21 which is shown in FIG. 3. The residual oil discharge port 32 is connected to the cargo handling device 19, or more specifically, connected to the cargo handling control valve 41.

The priority flow rate control valve 30 further comprises a spiring 34 which pushes the valve spool 33 in a direction which increases the distribution ratio of pressurized working oil to the priority discharge port 31, or in other words an application ratio of the section B.

The power steering device 20 comprises a load signal pressure port 22 which outputs a signal pressure indicative of the load of the power steering cylinder 23. The load signal pressure port 22 is connected to the priority discharge port 31 via two control orifices 36, and a pressure between the two control orifices 36 is lead as a load signal pressure to the priority flow rate control valve 30 via a load signal pressure line 35 and exerted on the valve spool 33 in the same direction as the direction in which the spring 34 pushes the valve spool 33. The power steering device 20 increases the pressure in the load signal pressure port 22 as an amount of the pressurized working oil falls into short supply with respect to an assist force for steering the steered wheels 3 that is designated by the rotation speed of the steering wheel 7, thereby increasing the pushing force on the valve spool 33 in the direction which increases the application ratio of the section B.

On the other hand, a pressure in the priority discharge port 31 is fed back as a feedback pressure to the priority flow rate control valve 30 via a damping orifice 37 and exerted on the valve spool 33 in the opposite direction to the direction in which the spring 34 and the load signal pressure push the valve spool, or in other words in the direction which increases the application ratio of the section A.

The steering control valve 21 selectively supplies the pressurized working oil supplied from the priority discharge port 31 of the priority flow rate control valve 30 to one of two oil chambers in the power steering cylinder 23 according to the rotation direction of the steering wheel 7. The power steering cylinder 23 turns the pair of steered wheels 3 to right or left according to the pressurized oil supply to one of the oil chambers.

The cargo handling control valve 41 selectively supplies the pressurized working oil supplied from the residual oil discharge port 32 of the priority flow rate control valve 30 to one of the oil chambers in response to the operation position of the cargo handling control lever 8. The cargo handling device 19 causes the mast device 5 to tilt the mast or hoist the fork along the mast according to this pressurized working oil supply to the cargo handling cylinder 42.

It should be noted that the cargo handling control valve 41 in a state where cargo handling is not performed, or in other words where the mast device 5 does not tilt the mast nor hoist the fork, recirculates the pressurized working oil supplied from the residual oil discharge port 32 to the reservoir 17 as shown in FIG. 3.

Figure 5:
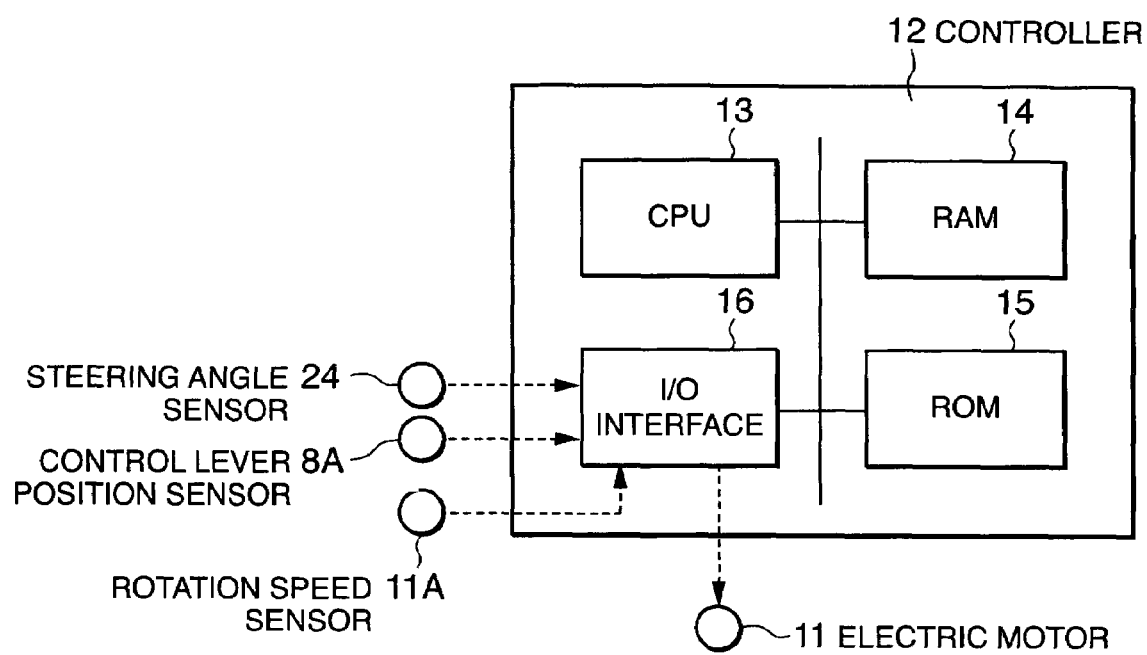
FIG. 5 is a schematic diagram of a controller according to this invention.

Referring to FIG. 5, the controller 12 is constituted by a microcomputer comprising a central processing unit (CPU) 13, a read-only memory (ROM) 14, a random access memory (RAM) 15, and an input/output interface (I/O interface) 16. The controller may be constituted by a plurality of microcomputers.

The ROM 16 stores a program of a rotation speed control routine and a deceleration control sub-routine for the electric motor 11 that will be described below.

The signals from steering angle sensor 24, the control lever position sensor 8A and the rotation speed sensor 11A are input via the I/O interface 16. The controller 12 varies the rotation speed of the electric motor 11 by controlling signals output through the I/O interface 16.

Figure 6:
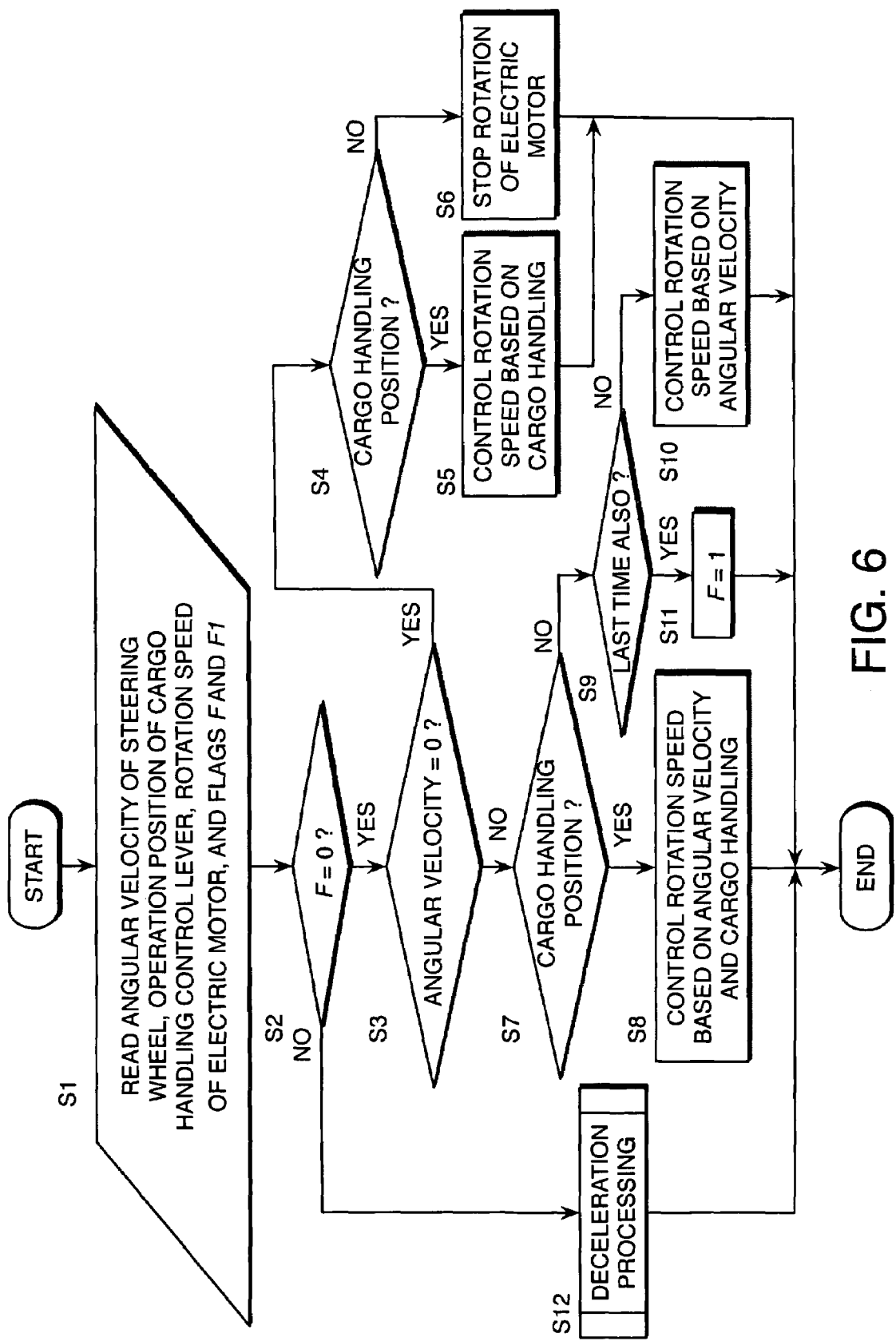
FIG. 6 is a flowchart describing a rotation speed control routine of an electric motor performed by the controller.

Next, referring to FIG. 6, the rotation speed control routine for the electric motor 11 will be described. The controller 12 performs this routine at intervals of ten milliseconds during an operation of the fork-lift truck.

In a step S1, the controller 12 reads the angular velocity of the steering wheel 7, the operation position of the cargo handling control lever 8, the rotation speed of the electric motor 11, a deceleration flag F which indicates whether or not the electric motor 11 is decelerating, and a synchronization flag F1.

When the deceleration flag F is at unity, this denotes that the electric motor 11 is decelerating and when it is at zero, this denotes that the electric motor 11 is not decelerating. The initial value of the deceleration flag F is zero. The synchronization flag F1 will be described later.

In a step S2, the controller 12 determines if the deceleration flag F is at zero. When the determination is affirmative, the controller 12 performs the processing of a step S3. When the determination is negative, the controller 12 performs deceleration processing of the electric motor 11 in a step S12. The processing of the step S12 is performed by performing the deceleration control sub-routine shown in FIG. 7. After the processing of the step S12, the controller 12 terminates the routine.

In the step S3, the controller 12 determines if the angular velocity of the steering wheel 7 is zero. When the determination in this step is affirmative, the controller 12 determines in a step S4 if the cargo handling control lever 8 is in operation. If the cargo handling control lever 8 is in operation, this means that the cargo handling control lever 8 is operated to a position which commands tilting of the mast or hoisting of the fork. The controller 12 performs the determination based on the detection signals from the control lever position sensor 8A.

When the determination in the step S4 is affirmative, the controller 12 controls the rotation speed of the electric motor 11 in a step S5 to a speed selected from predetermined speeds which are determined in advance according to the operation positions of the cargo handling control lever 8.

When the determination in the step S4 is negative, in a step S6 the controller 12 stops the operation of the electric motor 11. After the processing of the step S5 or the step S6, the controller 12 terminates the routine.

When the determination in the step S3 is negative, or in other words when the steering wheel 7 is in operation, the controller 12 determines in a step S7 if the cargo handling control lever 8 is in a cargo handling position.

When the determination in the step S7 is affirmative, the controller 12 controls the rotation speed of the electric motor 11 in a step S8 in accordance with the angular velocity of the steering wheel 7 and the operation position of the cargo handling control lever 8. After the processing of the step S8, the controller 12 terminates the routine.

When the determination in the step S7 is negative, the controller 12 determines in a step S9 if the cargo handling control lever 8 was in operation on the immediately preceding occasion when the routine was performed. When this determination is negative, in a step S10 the controller 12 controls the rotation speed of the electric motor 11 in accordance with the angular velocity of the steering wheel 7.

When the determination in the step S9 is affirmative, the controller 12 sets the deceleration flag F to unity in a step 111.

After the processing of the step S10 or the step S1, the controller 12 terminates the routine.

The controller 12 thus regulates the rotation speed of the electric motor 11 when the steering wheel 7 is operated such that the hydraulic pump 10 supplies the required amount of pressurized working oil corresponding to the angular velocity of the steering wheel 7 to the priority flow rate control valve 30.

As described hereintofore, the load signal pressure from the load signal pressure port 22 is input into the priority flow rate control valve 30. The load signal pressure rises as the load on the power steering device 20, or in other words the required amount of pressurized working oil increases, which makes the valve spool 33 displace in a direction which increases the application ratio of the section B. That is to say, the priority flow rate control valve 30 increases the distribution ratio of the pressurized working oil to the power steering device 20 as the load signal pressure rises. As a result, when the steering wheel 7 is operated while the cargo handling control lever 8 is not in operation, the amount of the pressurized working oil distributed to the cargo handling device 19 is equal to zero or nearly zero.

When the cargo handling control lever 8 is operated while the steering wheel 7 is not in operation, the controller 12 regulates the rotation speed of the electric motor 11 such that the hydraulic pump 10 supplies the required amount of pressurized working oil corresponding to the operation position of the cargo handling control lever 8 to the priority flow rate control valve 30. The priority flow rate control valve 30 supplies most of the pressurized working oil to the cargo handling device 19 as long as the load signal pressure from the load signal pressure port 22 is low.

When both the steering wheel 7 and the cargo handling control lever 8 are in operation, the controller regulates the rotation speed of the electric motor 11 such that the hydraulic pump 10 supplies the priority flow rate control valve 30 with the required amount of pressurized working oil that is the sum of the amount required by the power steering device 20 and the amount required by the cargo handling device 19. The priority flow rate control valve 30 distributes the pressurized working oil to the power steering device 20 first in the amount required, and then distributes the residual pressurized working oil to the cargo handling device 19.

Next, referring to FIG. 7, the deceleration control sub-routine for the electric motor 11 will be described.

In a first step S21, the controller 12 determines if the rotation speed of the electric motor is substantially equal to a predetermined reference speed R.

When the determination in the step S21 is affirmative, the controller 12 performs deceleration processing of a step S26 and subsequent steps.

The reference speed R is a rotation speed of the electric motor 11 at which kickback does not occur in the steering wheel 7 even when the pressure of the pressurized working oil which is supplied to the power steering device 20 drops due to a sudden decrease in the rotation speed of the electric motor 11 when the operation of the cargo handling device 19 stops. A typical reference speed R is a value within a range of 1000-1300 revolutions per minute (rpm). In order to determine the value of the reference speed R, a speed range in which kickback can occur is first determined through experiment and the reference speed R is set to a value outside that speed range.

When the determination in the step S21 is negative, the controller 12 determines in a step S22 if a synchronization flag F1 is at unity. The initial value of the synchronization flag F1 is zero. The synchronization flag F1 is set to unity in a step S26 when the rotation speed of the electric motor 11 substantially equals the reference rotation speed R in the step S21.

When the synchronization flag F1 is at unity in the step S22, the controller 12 performs the processing of a step S27 and subsequent steps. When the synchronization flag F1 is not at unity in the step S22, the controller 12 determines in a step S23 if the rotation speed of the electric motor 11 is higher than the reference speed R. When the rotation speed of the electric motor 11 is higher than the reference speed R, the controller 12 decreases the rotation speed of the electric motor 11 in a step S24 to the reference speed R. When the rotation speed of the electric motor 11 is not higher than the reference speed R, the controller 12 increases the rotation speed of the electric motor 11 in a step S25 to the reference speed R.

When the rotation speed of the electric motor 11 falls from a value which is lower than the reference speed R, there is a possibility that kickback will occur in the steering wheel 7. The processing of the step S25 prevents kickback by increasing the rotation speed of the electric motor 11 to the reference speed R before starting the deceleration processing of the rotation speed of the electric motor 11.

After the processing of the step S24 or the step S25, the controller 12 terminates the sub-routine.

On the other hand, the processing of the step S26 and the subsequent steps is processing to decrease the rotation speed of the electric motor 11 from the reference speed R at a gradient D during a predetermined time period T. The final target rotation speed of the electric motor 11 is set to a value which is slightly higher than a rotation speed of the electric motor 11 at which the hydraulic pump 10 can cover only the amount of pressurized working oil required by the power steering device 20.

The amount of pressurized working oil required by the power steering device 20 depends on the angular velocity of the steering wheel 7, but generally the hydraulic pump 10 can cover this amount when the rotation speed of the electric motor 11 is within a range of 2000-4000 rpm.

In the step S26, the controller 12 sets the synchronization flag F1 to unity and starts counting an elapsed time from the beginning of the deceleration processing.

In a next step S27, the controller 12 determines if the elapsed time has reached the predetermined time T. When the elapsed time has not reached the predetermined time T, the controller 12 decreases the rotation speed of the electric motor 11 at the gradient D in a step S28. The gradient D should be smaller or more gradual than a normal gradient of the rotation speed decrease of the electric motor 11 when the operation of the cargo handling device 19 is stopped in a state where only the cargo handling device 19 is in operation.

By making the gradient D gradual, the amount of electric power consumed by the electric motor 12 increases. By making the gradient D steep, electric power consumption by the electric motor 12 can be economized, but it becomes difficult to fully prevent kickback in the steering wheel 7. The gradient D should be predetermined in accordance with the type and specification of the industrial vehicle through experiment or simulation such that it can prevent kickback while suppressing increase in the power consumption of the electric motor 11. After the processing of the step S28, the controller 12 terminates the sub-routine.

When the elapsed time has reached the predetermined time T in the step S27, the controller 12, in a step S29, resets both the deceleration flag F and synchronization flag F1 to zero. The controller also resets the timer value to zero. After the processing of the step S29, the controller 12 terminates the sub-routine.

Next, referring to FIG. 8, variation in the rotation speed of the electric motor 11 corresponding to execution of the above rotation speed control routine will be described.

Before a time t0, both the cargo handling device 19 and the power steering device 20 are in operation and the electric motor 11 is rotating at a higher speed than the predetermined speed R. In this situation, the deceleration flag F is at zero. The angular velocity of the steering wheel 7 is larger than zero and the cargo handling control lever 8 is in a cargo handling position. In the rotation speed control routine of FIG. 6, therefore, the controller 12 performs the processing of the step S8 to control the rotation speed of the electric motor 11 such that the discharge amount of the hydraulic pump 10 covers the requirement of the power steering device 20 and the cargo handling device 19, both of which are in operation.

At the time t0, the operator moves the cargo handling control lever 8 to a non-operation position. Accordingly, in the rotation speed control routine, the determination in the step S7 becomes negative. Since the determination was affirmative on the immediately preceding occasion when the routine was performed, the determination in the step S9 is affirmative, and hence the controller 12 sets the synchronization flag F1 to unity in the step S11.

Figure 7:
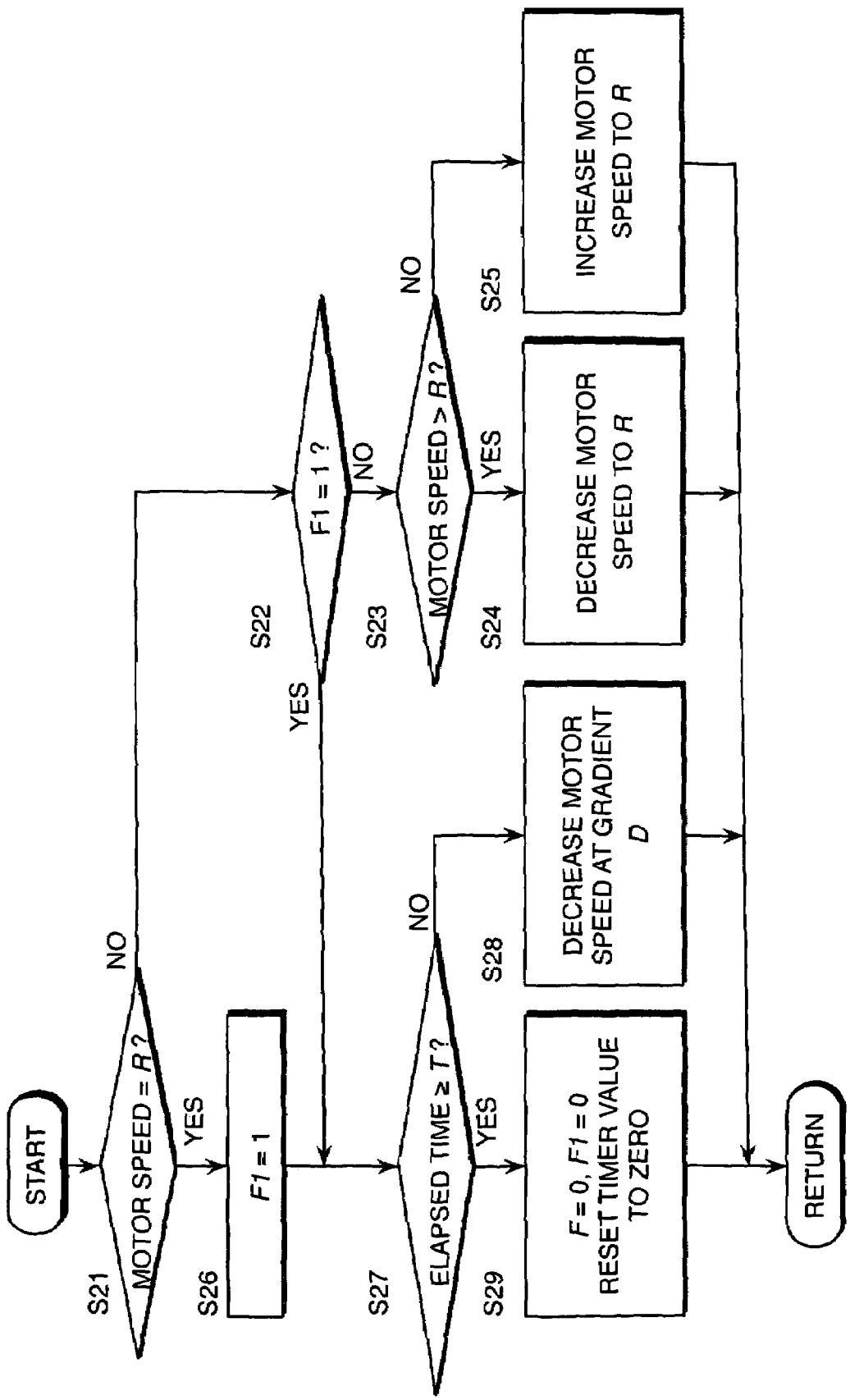
FIG. 7 is a flowchart describing a deceleration control sub-routine of the electric motor performed by the controller.

On the next occasion when the routine is performed, the determination in the step S2 becomes negative, and hence the controller 12 proceeds with the deceleration processing of the rotation speed of the electric motor 11 in the step S12 by performing the sub-routine of FIG. 7.

In the sub-routine, since the rotation speed of the electric motor 11 at the time t0 is higher than the reference speed R, the determination in the step S21 is negative and the determination in the step S22 is affirmative. The controller 21 therefore decreases the rotation speed of the electric motor 11 to the reference speed R in the step 523.

Due to the processing of the step S23, at a time t1 the rotation speed of the electric motor 11 equals the reference speed R. Hence, the controller 12 sets the synchronization flag F1 to unity in the step S26 and starts timer counting in the step S26.

Thereafter, until the timer value reaches the predetermined time T, the controller 12 decreases the rotation speed of the electric motor 11 at the gradient D in the step S28.

After the deceleration processing is started, the determination in the step S21 becomes negative, but since the synchronization flag F1 is at unity, the determination in the step S22 becomes affirmative and the controller 12 continues to decrease the rotation speed of the electric motor 11 in the step S28. Therefore, as shown in FIG. 8, the rotation speed of the electric motor 11 continues to decrease at the gradient D.

When the timer value reaches the predetermined time T at a time t2, the controller 12, in the step S29, resets the deceleration flag F, the synchronization flag F1, and the timer value to zero.

On the next occasion when the rotation speed control routine is performed, the controller 12 performs the processing of the step S10 and controls the rotation speed of the electric motor 11 to a target rotation speed corresponding to a case where only the power steering device 20 is in operation, or in other words a target rotation speed determined in accordance with the angular velocity of the steering wheel 7.

After a time t3 when the rotation speed of the electric motor 11 decreases to the target rotation speed, the controller 12 controls the rotation speed of the electric motor 11 according to the operation state of the power steering device 20.

Figure 8:
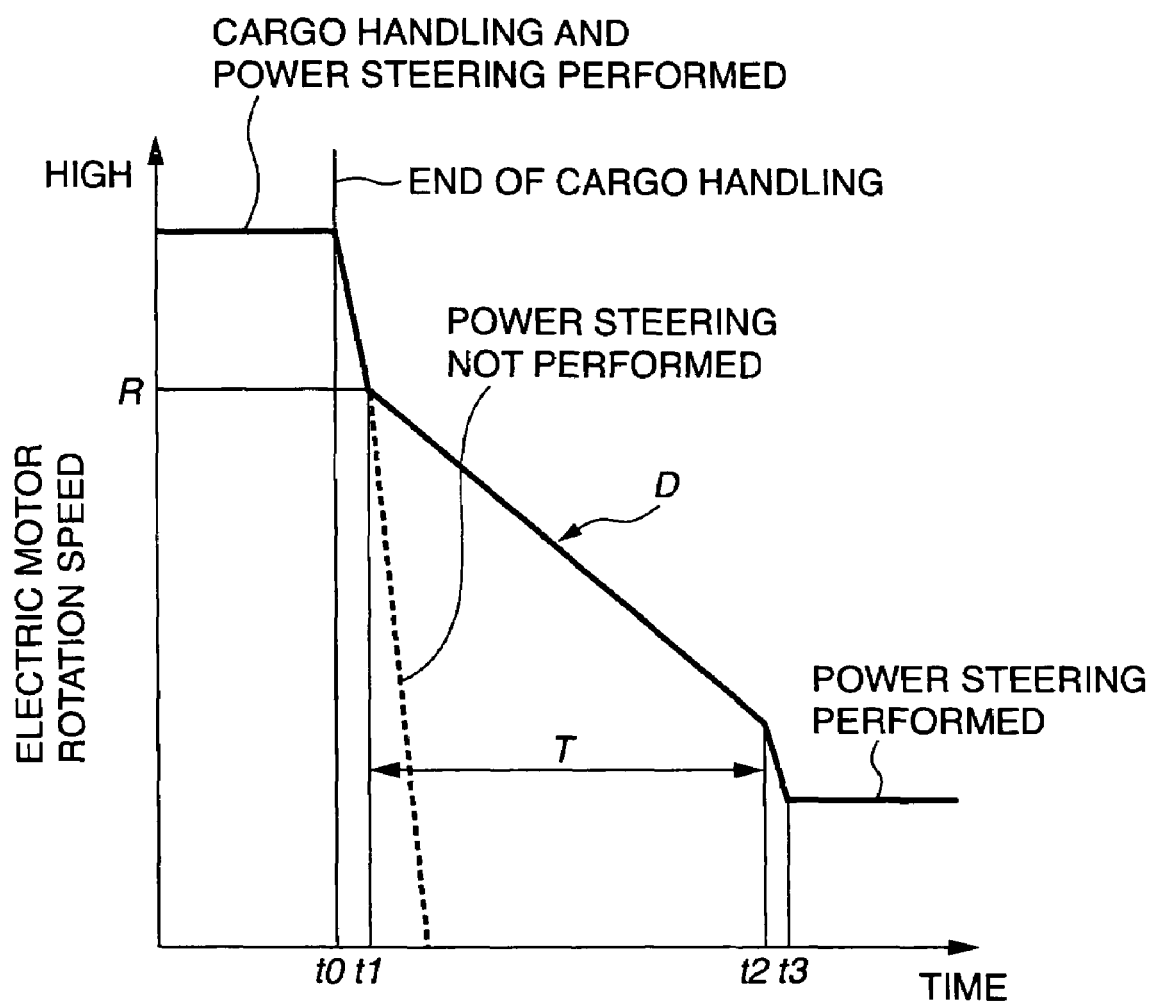
FIG. 8 is a timing chart describing a variation in the rotation speed of the electric motor according to execution of the rotation speed control routine.

In contrast, according to the prior art device, when the operation of the cargo handling device 19 is stopped at the time t1 in a state where both the power steering device 20 and the cargo handling device 19 are in operation, the rotation speed of the electric motor 11 shows a steep decrease as shown by a dotted line in FIG. 8.

In the priority flow rate control valve 30, the valve spool displaces towards the direction which increases the application ratio of the section B.

However, it takes time until the valve spool 33 displaces to the new position at which the priority flow rate control valve 30 distributes most of the pressurized working oil to the power steering device 20 due to a delay in the change in the balance between the load signal pressure and the feedback pressure because of the orifices 36 and 37. During the period before the valve spool 33 completes its displacement to the new position, a considerable amount of the pressurized working oil discharged from the hydraulic pump 10 is distributed to the cargo handling device 19, and therefore the power steering device 20 may suffer a shortage of pressurized working oil. As a result, the steering wheel 7 may suffer a kickback.

According to the hydraulic pressure supply device according to this invention, however, since the decrease in the rotation speed of the electric motor 12 is much more gradual than in the case of the prior art, the priority flow rate control valve 30, completes displacement of the valve spool 33 to the new position, in which most of the pressurized working oil is distributed to the power steering device 20, before the rotation speed of the electric motor 11 reaches the target rotation speed which is determined solely according to the angular velocity of the power steering device 20. Therefore, the power steering device 20 does not suffer a shortage of pressurized working oil supply and the steering wheel 7 does not suffer a kickback.

According to this hydraulic pressure supply device, before proceeding with the deceleration processing of the rotation speed of the electric motor 11, the controller 12 regulates the rotation speed of the electric motor 11 to the reference speed R during the time period t0-t1. The rotation speed of the electric motor 11 is not maintained at a high speed for an unnecessarily long time and increase in the electric power consumption in order to suppress kickback in the steering wheel 7 is suppressed to a minimum amount.

The contents of Tokugan 2005-143850, with a filing date of May 17, 2005 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the embodiment described above, this invention is applied to a hydraulic pressure supply device in a fork-lift truck, but this invention is applicable to a hydraulic pressure supply device for any industrial vehicle which supplies pressurized working oil from a single hydraulic pump to the power steering device and other hydraulic devices.

In the embodiment described above, this invention is described on the assumption that the industrial vehicle is equipped with a power steering device which is a fully hydraulic power steering device. This invention is however applicable to an industrial vehicle equipped with a power steering device which comprises a feedback mechanism that feeds back a rotation position of the steering wheel to control the hydraulic pressure supply to the power steering cylinder.

Although the embodiment described above is directed to control of an electric motor 11 which drives a hydraulic pump 10, this invention is applicable to control of an internal combustion engine which is adapted to drive the hydraulic pump 10, or control of a discharge flow rate of the hydraulic pump 10 when constituted by a variable capacity type.

Further, in the embodiment described above, the rotation speed of the electric motor 11 is decreased at a gradient D during a time period t1-t2 which is more gradual than the normal gradient applied when the operation of the cargo handling device 19 is stopped in a state where only the cargo handling device 19 is in operation. However, it is also possible to decrease the rotation speed of the electric motor 11 at the normal gradient, but retard the start of the decrease of the rotation speed instead. In this case also, a favorable effect in suppressing kickback in the steering wheel 7 is obtained. Causing a delay in decreasing the discharge flow rate of the hydraulic pump as claimed in the claims is realized either by applying a small decrease rate such as the gradient D or by retarding the start of decrease.

The embodiments of this invention in which an exclusive property or privilege is claimed are defined as follows:

What is claimed is:

1. A hydraulic pressure supply device for supplying pressurized working oil to a power steering device and a cargo handling device of an industrial vehicle, comprising:

a hydraulic pump which discharges the pressurized working oil;

a flow rate control valve which distributes the pressurized working oil to the power steering device and the cargo handling device, the flow rate control valve varying a distribution ratio between the pressurized working oil distributed to the power steering device and the pressurized working oil distributed to the cargo handling device according to a load signal pressure indicative of an amount of the pressurized working oil required by the steering device; and a programmable controller programmed to:
cause a discharge flow rate of the hydraulic pump to increase when the cargo handling device is in operation and decrease when the cargo handling device stops operation;
determine if the cargo handling device has stopped operation in a state where both the power steering device and the cargo handling device are in operation; and
cause a delay in decreasing the discharge flow rate of the hydraulic pump when the cargo handling device has stopped operation in a state where both the power steering device and the cargo handling device are in operation.

2. The hydraulic pressure supply device as defined in claim 1, wherein the device further comprises an electric motor to drive the hydraulic pump and the controller is further programmed to control a rotation speed of the electric motor in order to cause the discharge flow rate of the hydraulic pump to vary.

3. The hydraulic pressure supply device as defined in claim 2, wherein the controller is further programmed to decrease the rotation speed of the electric motor at a predetermined decrease rate which is smaller than a decrease rate applied when the cargo handling device stops operation in a state where only the cargo handling device is in operation, in order to cause a delay in decreasing the discharge flow rate of the hydraulic pump.

4. The hydraulic pressure supply device as defined in claim 3, wherein the industrial vehicle comprises a steering wheel, the hydraulic pressure supply device further comprises a sensor which detects an angular velocity of the steering wheel, and the controller is further programmed to control the rotation speed of the electric motor to cause the discharge flow rate of the hydraulic pump to coincide with a discharge flow rate which corresponds to the angular velocity of the steering wheel.

5. The hydraulic pressure supply device as defined in claim 4, wherein the controller is further programmed to control the rotation speed of the electric motor to cause the discharge flow rate of the hydraulic pump to coincide with a discharge flow rate which corresponds to the angular velocity of the steering wheel, after decreasing the rotation speed of the electric motor at a predetermined decrease rate for a predetermined time period, when the cargo handling device has stopped operation in a state where both the power steering device and the cargo handling device are in operation.

6. The hydraulic pressure supply device as defined in claim 3, wherein the controller is further programmed to regulate the rotation speed of the electric motor to a predetermined reference speed before causing a delay in decreasing the discharge flow rate of the hydraulic pump, when the cargo handling device has stopped operation in a state where both the power steering device and the cargo handling device are in operation.

7. A hydraulic pressure supply device for supplying pressurized working oil to a power steering device and a cargo handling device of an industrial vehicle, comprising:
a hydraulic pump which discharges the pressurized working oil;
a flow rate control valve which distributes the pressurized working oil to the power steering device and the cargo handling device, the flow rate control valve varying a distribution ratio between the pressurized working oil distributed to the power steering device and the pressurized working oil distributed to the cargo handling device according to a load signal pressure indicative of an amount of the pressurized working oil required by the steering device;
means for causing a discharge flow rate of the hydraulic pump to increase when the cargo handling device is in operation and decrease when the cargo handling device stops operation;
means for determining if the cargo handling device has stopped operation in a state where both the power steering device and the cargo handling device are in operation; and
means for causing a delay in decreasing the discharge flow rate of the hydraulic pump when the cargo handling device has stopped operation in a state where both the power steering device and the cargo handling device are in operation.

8. A hydraulic pressure supply method for supplying pressurized working oil to a power steering device and a cargo handling device of an industrial vehicle, the vehicle comprising a hydraulic pump which discharges the pressurized working oil and a flow rate control valve which distributes the pressurized working oil to the power steering device and the cargo handling device, the flow rate control valve varying a distribution ratio between the pressurized working oil distributed to the power steering device and the pressurized working oil distributed to the cargo handling device according to a load signal pressure indicative of an amount of the pressurized working oil required by the steering device, the method comprising:
causing a discharge flow rate of the hydraulic pump to increase when the cargo handling device is in operation and decrease when the cargo handling device stops operation;
determining if the cargo handling device has stopped operation in a state where both the power steering device and the cargo handling device are in operation; and
causing a delay in decreasing the discharge flow rate of the hydraulic pump when the cargo handling device has stopped operation in a state where both the power steering device and the cargo handling device are in operation.

* * * * *